United States Patent
Apte et al.

(10) Patent No.: US 11,507,517 B2
(45) Date of Patent: Nov. 22, 2022

(54) SCALABLE REGION-BASED DIRECTORY

(71) Applicant: Advanced Micro Devices, Inc., Santa Clara, CA (US)

(72) Inventors: Amit Apte, Austin, TX (US); Ganesh Balakrishnan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/033,212

(22) Filed: Sep. 25, 2020

(65) Prior Publication Data
US 2022/0100672 A1 Mar. 31, 2022

(51) Int. Cl.
*G06F 12/0895* (2016.01)
(52) U.S. Cl.
CPC ...... *G06F 12/0895* (2013.01); *G06F 2212/60* (2013.01)
(58) Field of Classification Search
CPC .......................... G06F 12/0895; G06F 2212/60
USPC ....................................................... 711/118
See application file for complete search history.

(56) References Cited

U.S. PATENT DOCUMENTS

| | | | | |
|---|---|---|---|---|
| 6,192,458 | B1 * | 2/2001 | Arimilli .............. | G06F 12/0864 711/220 |
| 8,635,428 | B2 * | 1/2014 | Karlsson ............. | G06F 12/1027 711/205 |
| 9,507,731 | B1 * | 11/2016 | Zheng .................. | G06F 12/084 |
| 10,515,049 | B1 * | 12/2019 | Fleming .............. | G06F 15/7892 |
| 2008/0010408 | A1 * | 1/2008 | Shen ................... | G06F 12/0864 711/118 |
| 2013/0205088 | A1 * | 8/2013 | Benhase ............. | G06F 12/0811 711/122 |
| 2014/0108733 | A1 * | 4/2014 | Wilkerson .......... | G06F 12/0804 711/E12.024 |
| 2015/0089159 | A1 * | 3/2015 | Busaba ............... | G06F 12/0815 711/144 |
| 2019/0050333 | A1 | 2/2019 | Chacon et al. | |
| 2019/0171578 | A1 * | 6/2019 | Patel ................... | G06F 12/0831 |
| 2019/0188137 | A1 * | 6/2019 | Kalyanasundharam ..................... G06F 12/0811 | |
| 2020/0183848 | A1 * | 6/2020 | Loh ..................... | G06F 12/0877 |
| 2021/0157736 | A1 * | 5/2021 | Bavishi ............... | G06F 12/0895 |

FOREIGN PATENT DOCUMENTS

EP 0567355 A2 10/1993

OTHER PUBLICATIONS

International Search Report and Written Opinion, Application No. PCT/US2021/051010 dated Dec. 3, 2021.
Jason Zebchuk et al: "Multi-grain coherence directories", Microarchitecture, ACM, 2 Penn Plaza, Suite 701 New York NY 10121-0701 USA, Dec. 7, 2013 (Dec. 7, 2013), pp. 359-370, XP058036258, DOI: 10.1145/2540708.2540739 ISBN: 978-1-4503-2638-4.

(Continued)

*Primary Examiner* — Reginald G Bragdon
*Assistant Examiner* — Aaron D Ho
(74) *Attorney, Agent, or Firm* — Liang & Cheng, PC

(57) ABSTRACT

Disclosed is a cache directory including one or more cache directories configurable to interchange within each cache directory entry at least one bit between a first field and a second field to change the size of the region of memory represented and the number of cache lines tracked in the cache subsystem.

21 Claims, 6 Drawing Sheets

(56) References Cited

OTHER PUBLICATIONS

Liu Peng et al: "Adaptive Coherence Granularity for Multi-Socket Systems", IEEE Transactions on Computers, IEEE, USA, vol. 66, No. 8, Aug. 1, 2017 (Aug. 1, 2017), pp. 1302-1312, XP011655344, ISSN: 0018-9340, DOI: 10.1109/TC.2017.2676768 [retrieved on Jul. 7, 2017].

* cited by examiner

SCALABLE REGION-BASED DIRECTORY

BACKGROUND

Modern computing systems have multiple central processing units (CPUs) that typically include and rely on multiple caches in a cache hierarchy to improve processor and memory performance. Compared to main memory, a cache is a smaller and faster memory device that stores data that is frequently accessed so the data may be accessed with low latency. Such cache devices are often implemented in static random access memory (SRAM) and are typically located between a processing unit that issues memory requests and the main memory device. A memory-side cache is a dedicated cache attached to a particular memory device or partition of memory that caches data being written to and read from the memory device by other devices.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol, for example, is the "MOESI" protocol, where each letter represents a state of the cache line. These states are as follows: the cache line has been modified (M), that the cache line is exclusive (E) or shared (S), or that the cache line is invalid (I). The owned (O) state indicates that the line is modified in one cache, that there may be shared copies in other caches, and that the data in memory is stale. Each cache line includes status bits in a cache directory, which keeps track of the cache lines that are currently in use by the system, to indicate which MOESI state the line is in.

Managing a cache directory scheme in a multiprocessor system has become difficult based on the various types of processing demands and the increase in cache and main memory sizes.

BRIEF DESCRIPTION OF THE DRAWINGS

The embodiments illustrated in the figures of the accompanying drawings herein are by way of example and not by way of limitation. In the drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

As the number of CPUs, respective caches and cache sizes grows larger, the cache directories also scale up to cover a larger number of entries. Typically, the cache directory is accessed on a per cache line basis to figure out where exactly the line has been cached in the system and the line's current state to correctly filter out snoops as requests are received. In one embodiment, to reduce the amount of chip area the directory consumes the cache directory tracks regions of memory corresponding to groups of cache lines in the system instead of a single cache line. In this way decisions may be made collectively for that entire group of cache lines.

Figure 1:
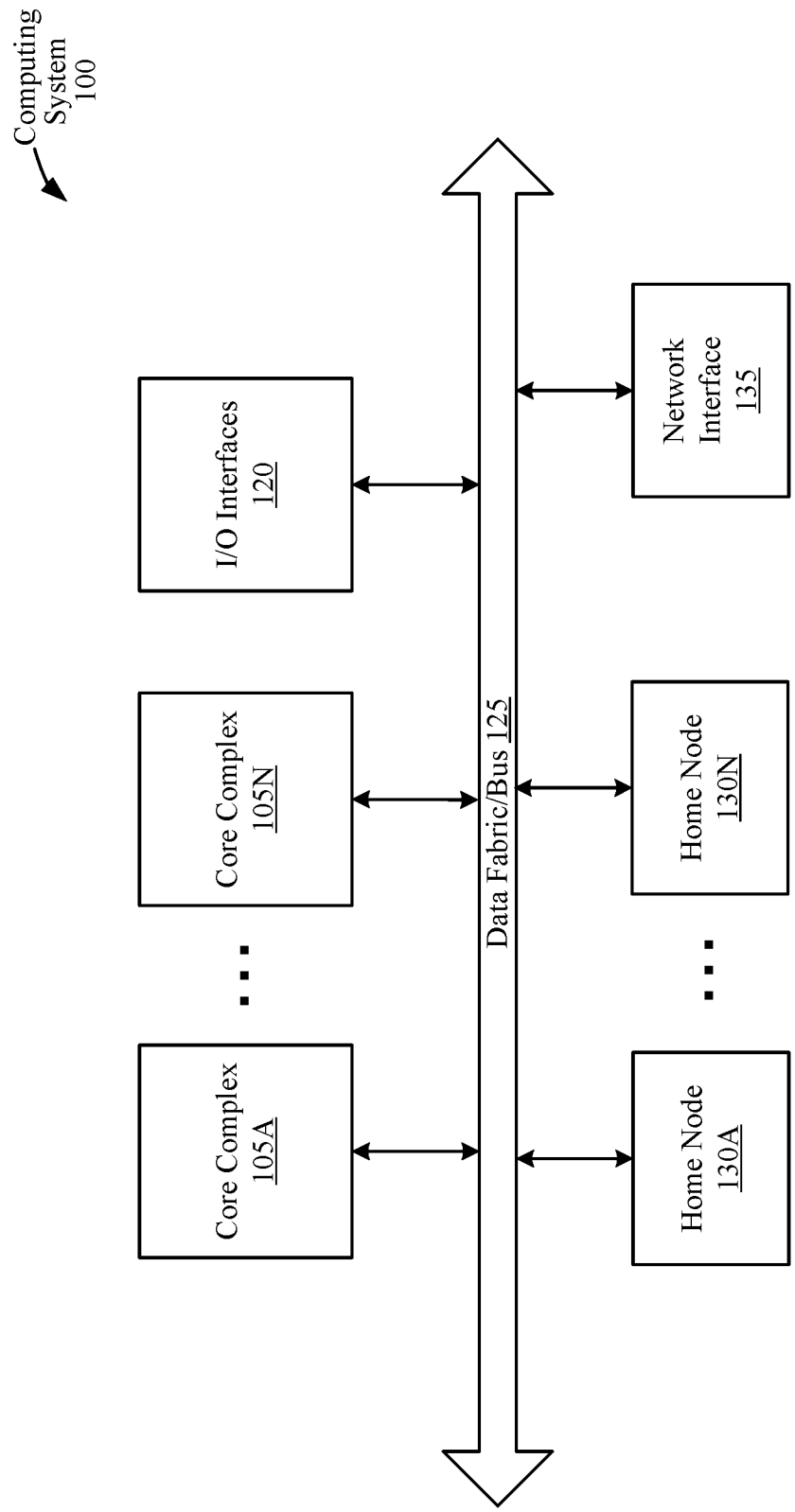
FIG. 1 is a block diagram of one embodiment of a computing system.

One embodiment of a cache directory scheme may reconfigure, statically or dynamically, the size of the region of memory and the number cache lines tracked in each cache directory entry. FIG. 1 is a block diagram of one embodiment of a computing system 100 including multiple core complexes 105A-N and multiple home nodes 130A-N that may be configured to change the size of the region of memory and the number cache lines tracked per cache directory entry. Computing system 100 also includes, input/output (I/O) interfaces 120, data fabric/bus 125, and network interface 135. In other embodiments, computing system 100 may include other components and/or be arranged in other configurations.

In one embodiment, each core complex 105A-N includes processing components, such as one or more processor cores or other specialized processing components. Each processor core within core complex 105A-N includes a cache subsystem with one or more levels of caches. In one embodiment, the cache subsystem includes a shared cache connected to each core complex 105A-N (e.g., L3 cache 230 in FIG. 2). In some embodiments, one or more core complexes 105A-N may include a data parallel processor with a highly parallel architecture, such as one or more of graphics processing units (GPUs), digital signal processors (DSPs), field programmable gate arrays (FPGAs), application specific integrated circuits (ASICs), and so forth. As used herein a "core complex" can also be referred to as a "processing node" or a "CPU" or "CPU complex".

In one embodiment, home node(s) 130 may include one or more of a coherent slave, a cache directory, and a memory controller coupled to any number and type of memory devices (not shown). For example, the memory device(s) coupled to home node(s) 130 may include Dynamic Random Access Memory (DRAM), Static Random Access Memory (SRAM), NAND Flash memory, NOR flash memory, Ferroelectric Random Access Memory (FeRAM), or others.

I/O (input/output) interfaces 120 are representative of any number and type of I/O interfaces, for example but not limited to the various types of peripheral component interconnect (PCI) buses, gigabit Ethernet (GBE) bus, universal serial bus (USB), specialty processors (e.g., platform security processors, graphics processors), and system management logic. Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a server, desktop computer, laptop, mobile device, game console, streaming device, wearable device, or any of various other types of computing systems or devices. The number, orientation, and type of components illustrated in computing system 100 is by way of example only and can vary from embodiment to embodiment based on application and system architecture.

Figure 2:
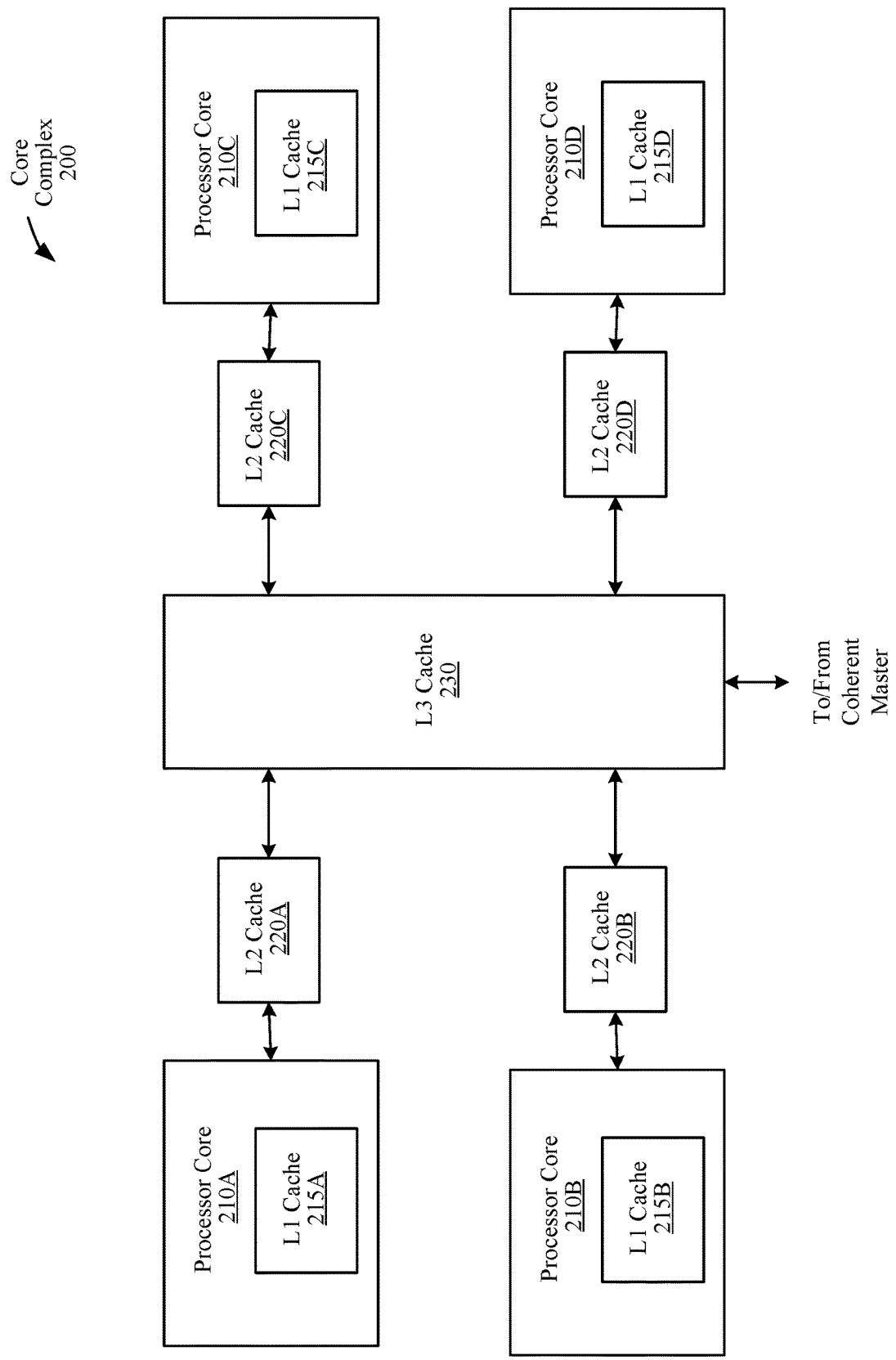
FIG. 2 is a block diagram of one embodiment of a core complex.

FIG. 2 is a block diagram of one embodiment of a core complex 200, for example, the core complexes 105A-N of FIG. 1. In one embodiment, core complex 200 may include four processor cores 210A-D and a cache subsystem including L1 cache 215A-D, L2 cache 220A-D, and an L3 cache 230. The cache subsystem may include high-speed cache memories (e.g., L1 cache 215A-D, L2 cache 220A-D, and an L3 cache 230) configured to store blocks of data (not shown). As used herein, a "block" is a set of bytes stored in contiguous memory locations within the cache memories, which are treated as a unit for coherency purposes. Additionally, each of the terms "cache block", "block", "cache line", and "line" is interchangeable herein. In some embodiments, a block can also be the unit of allocation and deallocation in a cache. A block may be retrieved from other caches within the system, such as from other core complexes (e.g., core complexes 105A-N of FIG. 1), or from the main memory, for example as may be retrieved through home node 130A of FIG. 1.

Additionally, in one embodiment, the L3 cache 230 is shared by each of the processor cores 210A-D. L3 cache 230 is coupled to a coherent master for access to the data fabric (e.g., data fabric/bus 125 of FIG. 1) and memory subsystem (not shown). In other embodiments, core complex 200 may include fewer or more processor cores (e.g., processor core 210A) and corresponding L2 caches (e.g., L2 cache 220A). In yet other embodiments, core complex 200 may include other types of addressable cache subsystems that may include different numbers, types, and levels of cache memories without departing from the scope of this disclosure.

Figure 3:
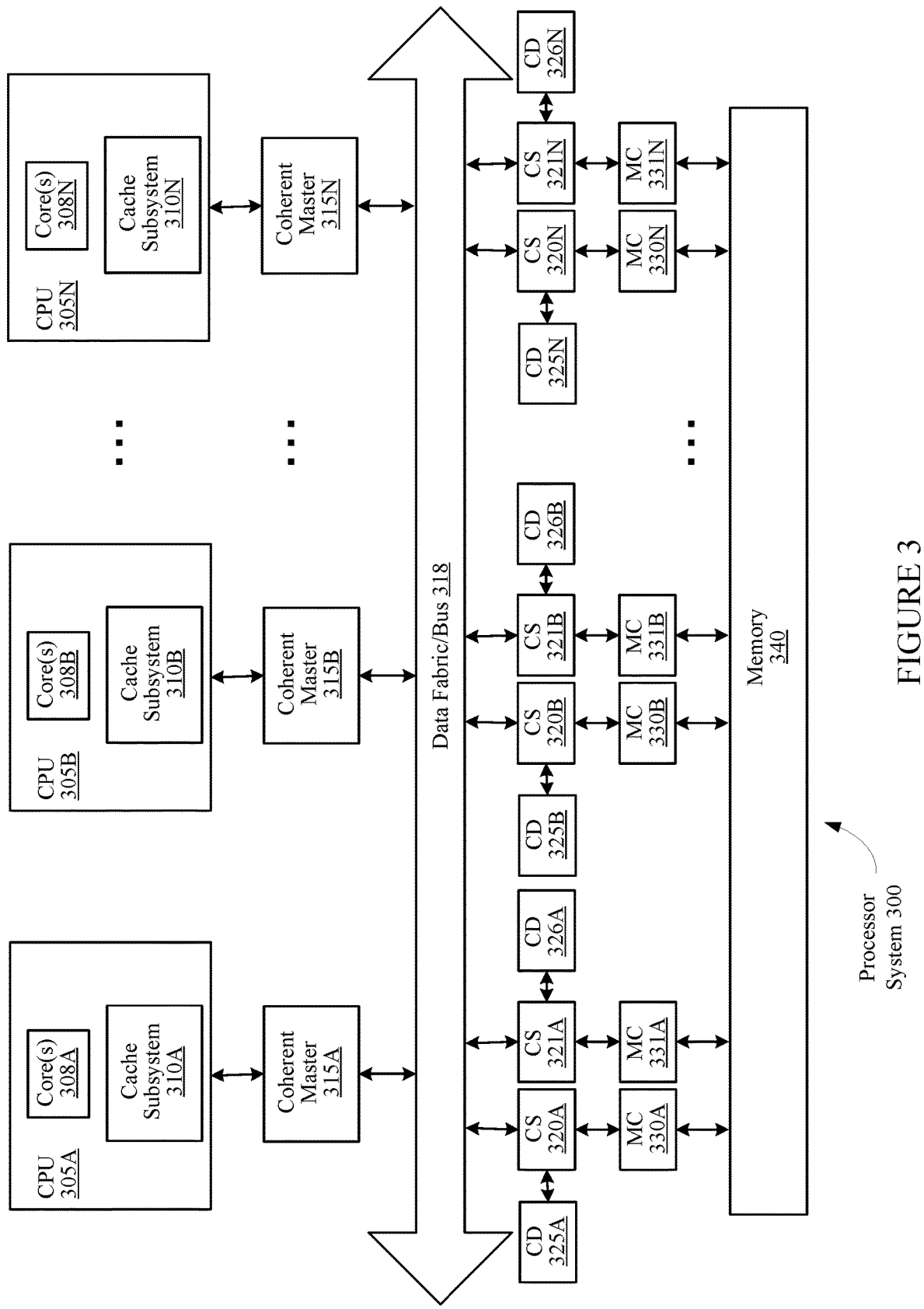
FIG. 3 is a block diagram of one embodiment of a multi-CPU processor system.

FIG. 3 is a block diagram of one embodiment of a processor system 300. In one embodiment, processor system 300 includes multiple core complexes as illustrated by CPUs 305A-N. In various embodiments, the number of CPUs (e.g., CPU 305A) and number of cores (e.g., cores 308A-N) per CPU may vary according to design choice. Each CPU 305A-N also includes a corresponding one of the cache subsystems 310A-N. In various embodiments, the cache subsystems 310A-N may vary in size and structure as described above with reference to FIG. 2.

In one embodiment, each CPU 305A-N is connected to a corresponding coherent master 315A-N that is further connected to a data fabric/bus 318. As used herein, a "coherent master" is defined as an agent that processes traffic flowing over an interconnect (e.g., data fabric/bus 318) and manages cache coherency, which includes each coherent master (e.g., coherent masters 315A-N) working in concert to generate, receive, and process coherency-related messages and probes for synchronizing copies of shared cache data within processor system 300.

In various embodiments, each CPU 305A-N may be connected to one or more coherent slaves by a corresponding coherent master 315A-N and data fabric/bus 318. For example, CPU 305A may be connected to multiple coherent slaves that have access to each other's cache directories, such as, coherent slave (CS) 320A-D and coherent slave 321A-D, each connected through coherent master 315A and data fabric/bus 318. Coherent slave 320A is connected to memory controller (MC) 330A and cache directory (CD) 325A, while coherent slave 321A is coupled to memory controller 331A and cache directory 326A. Each memory controller 330A-N and 331A-N is connected to a respective one of the memory devices 340A-N and 341A-N. One of the functions of each memory controller, such as memory controller 330A, is to provide the elements of the processor system 300 access to the memory devices 340A-N and 341A-N. In various embodiments, although shown as one block, each of the memory devices 340A-N and 341A-N may be a composed of one or more physical memories and may be of any type suitable for storing data, such as Dynamic Random Access Memory (DRAM), Static Random Access Memory (SRAM), etc.

In one embodiment, each cache directory, for example cache directory 325A, includes one or more entries and each entry corresponds to a region in the memory 340A. Each entry includes information (e.g., see FIG. 4) to track cached data within the processor system 300 that corresponds to the data within the region in the memory 340A. The region size, sometimes called page size, may be defined by a block of addresses in the memory 340A, and which addresses may vary among embodiments depending on how the memory is organized, for example, whether the memory is interleaved or not across channels and the memory address map base. In one embodiment, one or more fields of an entry are configurable to change the page size of the region in the memory 340A that is being tracked by the cache directory.

In one embodiment, the memory in devices 340A-N and 341A-N is divided up among each of the memory controllers 330A-N and 331A-N equally and each coherent slave (e.g., coherent slaves 320A-N and 321A-N) and their respective cache directories (e.g., cache directories 325A-N and 326A-N) manages a respective equal and contiguous portion of the memory. Alternatively, some or all of the memory devices 340A-N and 341A-N have differing memory capacities. In various embodiments, a coherent slave may have access to one or more other coherent slave's cache directories. For example, coherent slave 320A may have access to multiple other cache directories within the processor system 300, such as 326A-N and 325B-N.

In one embodiment, when a coherent slave 320A receives a memory request targeting its corresponding memory controller 330A, the coherent slave 320A performs a lookup in its corresponding cache directory 325A to determine if the request targets data in a memory location encompassed within a region of the memory 340A tracked by an entry in the cache directory 325A, and whether the memory request results in a cache hit, meaning that the requested data can be found in the cache lines stored in the cache subsystem 310A-N associated with the region. In one embodiment, if the lookup results in a hit, then the coherent slave 320A sends a probe to the CPU(s) (e.g., CPUs 305A-N) which are identified in the hit entry in the cache directory. The type of probe that is generated by the coherent slave 320A depends on the coherency state specified by the hit entry.

In one embodiment, the coherent slave 320A may reconfigure the cache directory 325A to change the region size and thus the number of cache lines tracked within the cache subsystems 310A-N by interchanging at least one bit between a tag field and a reference count field of each entry in cache directory 325A.

Increasing the region size and thus the number of cache lines tracked per cache directory entry decreases the granularity of the cache line tracking in the processing system. As a result, the cache directory can accommodate larger cache system sizes.

Although not shown in FIG. 3, in other embodiments there may be other connections from data fabric/bus 318 to other components not shown to avoid obscuring the figure. For example, in another embodiment, data fabric/bus 318 includes connections to one or more I/O interfaces and one or more I/O devices, such as shown in FIG. 1.

Figure 4:
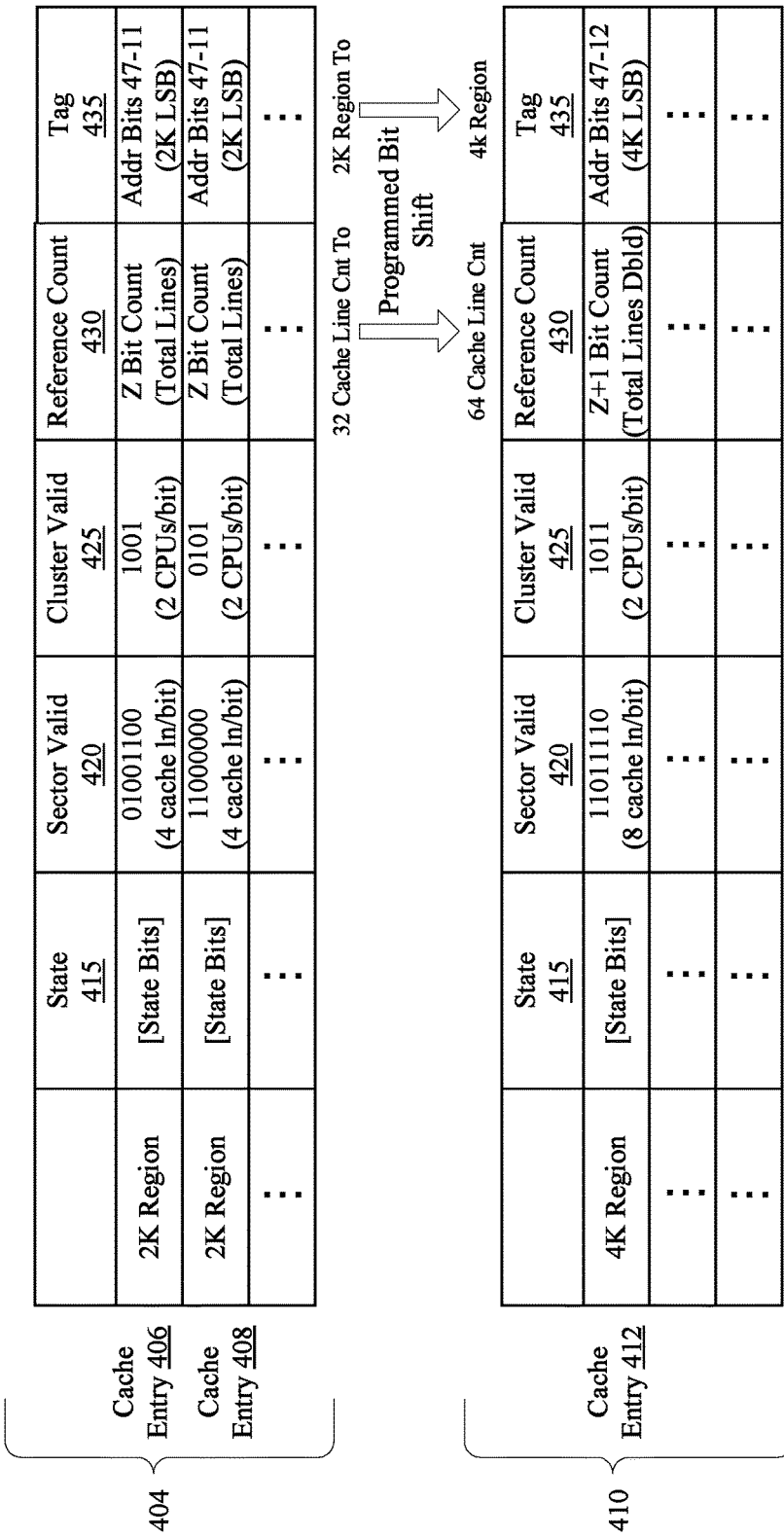
FIG. 4 is a block diagram of one embodiment of a cache directory.

FIG. 4 is a block diagram of one embodiment of a cache directory 400. In one embodiment, the cache directory 400 includes a cache directory controller 402, a cache directory array 404 that includes cache directory entry 406 and cache directory entry 408. The cache directory 400 also includes cache directory array 410 that includes cache directory entry 412 and is illustrated for after a programmed bit reassignment to increase region size, which is described further below. In one embodiment, each entry of array 404 and array 410 includes a state field 415, a sector valid field 420, a cluster valid field 425, a reference count field 430, and a tag field 435. In other embodiments, the entries of array 404 and array 410 may include other fields and may be arranged according to design choice.

In one embodiment illustrating a change in region size, a bit reassignment is initiated to increase the region size of each cache directory entry. This increases the cache line use tracking capacity of the reference count field 430 for each CPU complex in the processor system (e.g., CPU(A-N) in processor system 300 of FIG. 3). In various embodiments, the width the reference count field 430 is dependent upon the number of CPU complexes in the processor system since each CPU complex includes cache lines to be tracked.

The reference count field 430 is used to track the number of cache lines of the region which are cached somewhere in the processor system. For each new subscription to a cache line from this region, the reference count field 430 is incremented. For each cache line from this region that gets evicted from the caches, the reference count field 430 decrements. Eventually, if the reference count field 430 reaches zero, the cache directory entry (e.g., entry 406) is marked invalid and the entry can be reused for another region in memory. By utilizing the reference count field 430, the incidence of region invalidate probes can be reduced. The reference count field 430 allows a cache directory entry to be reclaimed when the cache directory entry is associated with a region that no longer has active cache lines in the processor system's caches.

For example, returning to FIG. 4, assuming the bit width of each entry is fixed, to double the region size of each cache directory entry, a tag bit from the tag field 435 is shifted to the reference count field 430. For a 2K region and a 48-bit address width, the first 11 [10–0] bits are used for the offset and define the region size (2^11=2048 (2K)). Assuming a 64-byte cache line size, the 2 kilobyte (K) region size the number of cache lines per region would be 2K/64 or 32 cache lines per region. The tag field 435 would be the most significant 36 bits from [47–11] of the address, and the 11 least significant bits of the address correspond to the 2K region size as described above. Thus, the reference count field 430, as shown in cache directory entries 406 and 408, would have Z bits corresponding to the total number of cache lines to track as determined by the number of cache lines per CPU cluster and the total number of CPU clusters.

Now to increase the region size to 4K, according to one embodiment, a bit is reassigned from the tag field 435 to the reference count field 430, such that the tag field 435 now includes the most significant 35 bits from [47–12] and the least significant bits [11–0] are the offset for the 4k (2^12) region size. Now for the same 64-byte cache line size, a 4K region would include 4K/64 or 64 cache lines per region. The reference count field 430 as shown in cache entry 412 is Z+1 bits after shifting the bit over from the tag field 435, which in binary doubles the number of lines being tracked. In other embodiments, the region may be decreased by reassigning a bit from reference count field 430 to tag field 435, or more than one bit may be reassigned to and from the tag field 435 and reference count field 430 to create larger or smaller region sizes.

The cluster valid field 425 includes a bit vector to track the presence of cache lines within the core complexes (e.g., CPUs 305A-N in FIG. 3) associated with the defined region represented by the cache directory entry. For example, there may be 8 CPU cores grouped together into 4 CPU clusters of 2 CPU cores each. In this example, the cluster valid field 425 would have 4 bits, each representing 2 CPU cores of the 8 CPU cores in the processor system. If, for example, if the cluster valid field 425 vector is [1001] then only the first and fourth CPU clusters have interacted with the any of the cache lines represented by the region. In one embodiment, the sector valid field 420 stores a bit vector corresponding to sub-groups or sectors of cache lines within the region to provide fine grained tracking within the region. For example, as described above, for a 64-byte cache line and a 2 kilobyte (K) region size, the number of cache lines per region would be 2K/64 or 32 cache lines per region. For an 8-bit sector valid field 420, each bit would have to track 32/8, or 4 cache lines per sector. If, for example, the region size was increased as described above to 4K with the same 64-byte cache line size the number of cache lines tracked would be 4K/64, or 64 lines per region. Then for the same 8-bit sector valid field 420, each bit would have to track 64/8, or 8 cache lines per sector. The reduction in granularity can be tolerated by certain applications that are not widely shared across multiple cache complexes with a benefit, for example, of additional cache system coverage obtained by increasing the region size.

In one embodiment, the state field 415 includes state bits that specify the aggregate state of the plurality of cache lines in the cache line subsystem associated with the region. The aggregate state for the cache lines is defined by the most restrictive cache line state for each region. For example, the state field 415 for a cache directory entry associated with a region is set to "dirty" if at least one cache line for the entire region comprised of the plurality of cache lines is dirty. Similarly, the state for a given region is set to "shared" if at least one cache line of the entire given region is shared. In various embodiments, there may be other states of a single cache line entry of a region that are attributed to the entire region in a similar fashion.

The organization of sub-groups or sectors and the number of bits in sector valid field 420 may vary among different embodiments. In one embodiment described above the sector valid field had 8 bits, however, in other embodiments the sector valid field may have additional bits to increase granularity or fewer bits to decrease granularity. Additionally, in one embodiment, the partitions may be identified using offsets which are stored in the sector valid field 420. Each offset identifies the location of the given partition within the given region. In another embodiment, the sector valid field 420 may also indicate separate owners and separate states for each partition within the given region.

Figure 5:
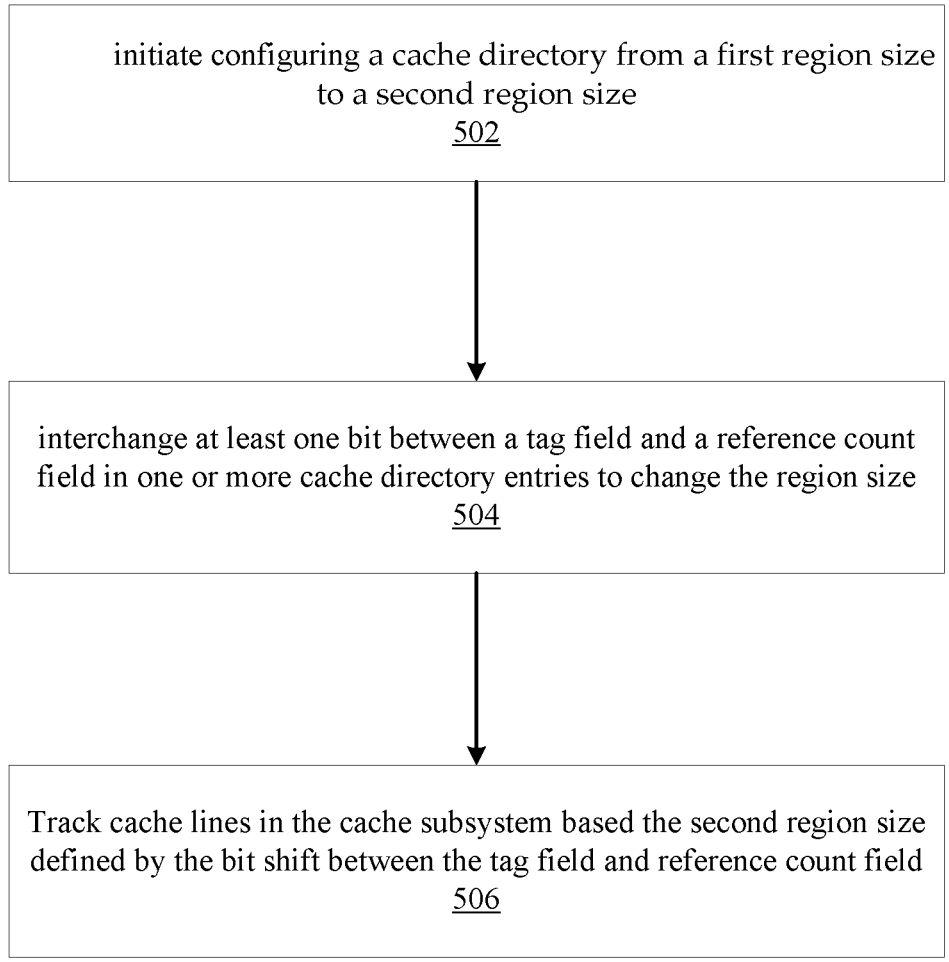
FIG. 5 is a flow diagram of a process illustrating one embodiment of a method for changing the region size of cache lines tracked in a processor system.

FIG. 5 is a flow diagram of process 500 illustrating one embodiment of a method for changing the size of the region of memory and the number cache lines tracked in each cache directory entry in a processor system. In one embodiment the process 500 is initiated by reading and executing configuration settings and instructions at system start up. In other embodiments, one or more programs or applications may be configured to automatically monitor cache utilization and dynamically initiate the process 500, or may be configured to accept input, such as user input, to initiate the process 500. In other embodiments, cache utilization may be remotely monitored for one or more computing systems and each system may be configured to initiate the process 500, based on a remote command.

At block 502 the processor system reconfigures a cache directory from tracking a first region size to a second region size, the region size being defined by the number of offset bits removed from the address in the tag field (e.g., tag field 435 in FIG. 4) corresponding to a starting address and page size in memory (e.g., memory 340A-N and 341A-N in FIG. 3). The process continues at block 504 where the cache directory entry array fields are reconfigured by interchanging at least one bit between a tag field and a reference count field (see FIG. 4). As described above, this reassignment either increases or decreases the region corresponding to memory page size and the number of cache lines tracked in the processor system depending on the direction of the bit reassignment. Upon completion of the reconfiguration, at block 506, the cache directory may now track cache lines in the cache subsystem based the reconfigured region size based on the bit reassignment.

Figure 6:
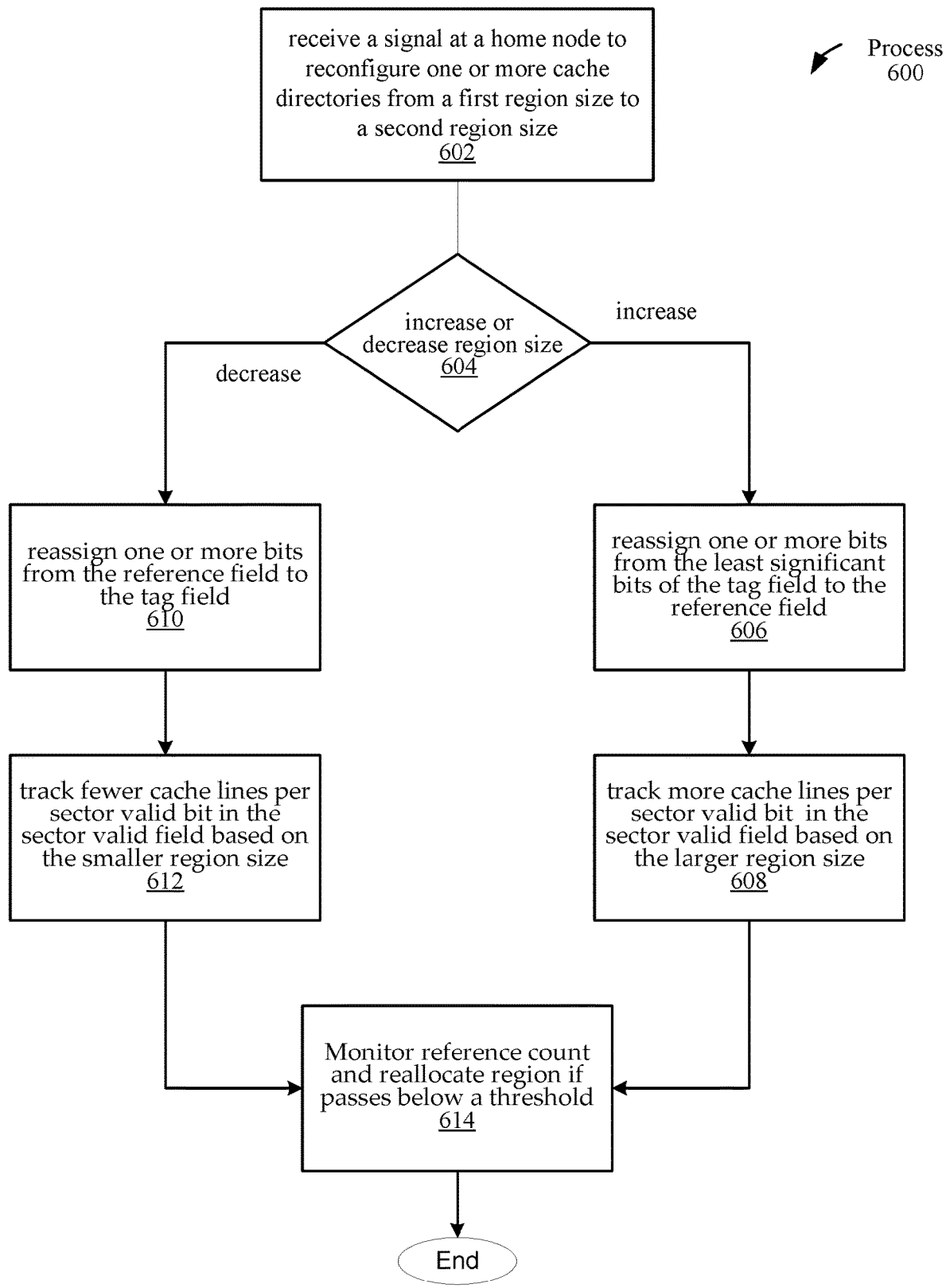
FIG. 6 is a flow diagram of a process illustrating one embodiment of a method for increasing or decreasing the region size and reallocating the region as needed.

FIG. 6 is a flow diagram of process 600 illustrating one embodiment of a method for increasing or decreasing the region size and reallocating the region based on utilization. Beginning at block 602, a home node within a processor system (e.g., processor system 300 in FIG. 3) receives a signal to reconfigure one or more cache directories from a first region size to a second region size as defined by the number of offset bits removed from the address in the tag field corresponding to a starting address and page size in memory.

At decision block 604 the region size is either increased or decreased based on the signal received in block 602. If increased, at block 606, in one embodiment, the cache directory controller (e.g., cache directory controller 402 in FIG. 4) in the cache directory configures the cache directory entry array (e.g., cache directory array 404 in FIG. 4) by reassigning one or more bits from the least significant bits of the tag field to the reference count field. Each bit reassigned doubles the region size as defined by the address offset in the tag field and each bit added to the reference field doubles the number of cache lines the field may track in the processor system's one or more cache subsystems (e.g., cache subsystems 310A-N in FIG. 3). In one embodiment, at block 608, the increased cache lines to be tracked means that each bit in the sector valid field tracks more cache lines based on the larger region size and the expanded reference count field (see 2K/4K example illustrated above with reference to sector valid field 420 in FIG. 4).

Similarly, if the region size is decreased, at block 610, the cache directory controller in the cache directory configures the cache directory entry array by reassigning one or more bits from the reference count field to the tag field. Each bit reassigned halves the region size as defined by the address offset in the tag field, and each bit taken from the reference field halves the number of cache lines the field may track in the processor system's one or more cache subsystems. In one embodiment, at block 612, the decreased cache lines to be tracked means that each bit in the sector valid field tracks fewer cache lines based on the smaller region size and reduced reference count field.

In one embodiment, at block 614, the reference count may be monitored to determine how many cache lines in the processor system's cache subsystem(s) are subscribed to or being utilized. For example, the reference count may decrement for each cache line associated with the region that is evicted, or incremented for each cache line that is added. In one embodiment, a change in region size is triggered when the reference count decrements below a threshold value. Although the blocks of FIG. 6 are shown executing serially, in other embodiments, the blocks, for example blocks 606-614 or blocks 610-614, may execute in parallel or concurrently with each other.

Disclosed is a method for maintaining a cache directory including one or more cache directory entries for tracking cache lines for a first region size and configuring those one or more cache directory entries for tracking cache lines for a second region size. Each of the one or more cache directory entries include a first field and a second field. The first field corresponds to a first region in a memory having a first page size and the second field tracks a first number of cache lines stored in a cache subsystem associated with the first region.

Configuring the one or more cache directory entries for tracking cache lines for a second region size includes interchanging at least one bit between the first field and the second field in the cache directory to change the first region to a second region corresponding to a second page size in the memory and to change a maximum number of cache lines tracked by each of the one or more cache directory entries. The interchanging of at least one bit includes reassigning the at least one bit from the least significant bits of the first field to the second field to increase the region size by increasing a number of offset bits. In one embodiment, the second region size is greater than the first region size and the reassigning of the at least one bit to the second field increases the maximum number of cache lines tracked in the cache subsystem to correspond to increased region size.

Depending on region size, the first page size may contain an amount of data equal to a multiple of two or more cache lines cached in the cache subsystem. In another embodiment, the process includes configuring a second cache directory from tracking cache lines for the first region size to tracking cache lines for the second region size, and the second cache directory is coupled to the home node by a data fabric. In yet another embodiment, the process includes changing the number of cache lines tracked per bit in a third field of the one or more cache entries based on the configuring the one or more cache directory entries for tracking cache lines for the second region size. The process may include for each entry of the one or more cache directory entries, reallocating the entry for tracking another portion of the memory when the value of the second field in the entry reaches a threshold value.

In one embodiment, a processing system includes one or more home nodes coupled to one or more cache directories, each cache directory can change from tracking cache lines for a first region size per cache line entry to tracking cache lines for a second region size per cache line entry, and the first region size is associated with a first page size of a memory and the second region size is associated with a second page size of the memory. The processing system may further include a plurality of processing nodes coupled to the one or more home nodes, each processing node including one or more processors and a cache subsystem including cache lines tracked by the one or more cache directories.

The processing system to change from tracking cache lines from a first region size per cache line entry to tracking cache lines for a second region size per cache line entry may include the one or more cache directories to interchange at least one bit between a first field and a second field of each cache line entry. In one embodiment, each of the one or more home nodes may receive a signal to initiate the interchange in the one or more cache directories of the at least one bit between the first field and the second field. The processing system to interchange the at least one bit may reassign at least one bit from the least significant bits of the first field to the second field, and the loss of the at least one bit in the first field increases the second region size compared to the first region size and the addition of the at least one bit in the second field increases the maximum number of cache lines tracked by each of the one or more cache directory entries.

In one embodiment, the second page size contains an even multiple of two or more cache lines cached in the cache subsystem. In another embodiment, at least one of the one or more home nodes can configure a second cache directory from tracking cache lines for the first region size to tracking cache lines for the second region size, and the second cache directory is coupled to the coherent slave by a data fabric. The at least one of the one or more home nodes can, in at least one of the one or more cache directories, change the number of cache lines tracked per bit in a third field of the one or more cache directory entries for tracking cache lines for the second region size In one embodiment, a cache directory includes one or more cache entries and can change from tracking cache lines for a first region size per cache line entry to tracking cache lines for a second region size per cache line entry. The first region size is associated with a first page size of a memory and the second region size is associated with a second page size of the memory. A cache directory controller may be coupled to the cache directory and can interchange, in the one or more cache entries, at least one bit between a first field and a second field of each cache entry to change from the first region size to the second region size. In one embodiment, for the cache directory controller to interchange the at least one bit there is a reassignment of the at least one bit from the least significant bits of the first field to the second field, and the loss of the at least one bit in the first field increases the second region size compared to the first region size and the addition of the at least one bit in the second field increases maximum number of cache lines tracked by each of the one or more cache directory entries. In one embodiment, the second page size contains an even multiple of two or more cache lines cached in the cache subsystem.

The embodiments described herein may include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A method comprising:
   maintaining a cache directory including one or more cache directory entries for tracking cache lines for a first region size; and
   configuring the one or more cache directory entries for tracking cache lines for a second region size,
   wherein the configuring further comprises changing a number of cache lines tracked per bit in field of the one or more cache entries.

2. The method of claim 1, wherein each of the one or more cache directory entries comprises a second field and a third field, the second field corresponds to a first region in a memory having a first page size, and the third field tracks a first number of cache lines stored in a cache subsystem associated with the first region.

3. The method of claim 2, wherein the configuring of the one or more cache directory entries for tracking cache lines for a second region size comprises interchanging at least one bit between the second field and the third field in the cache directory to change the first region to a second region corresponding to a second page size in the memory and to change a maximum number of cache lines tracked by each of the one or more cache directory entries.

4. The method of claim 3, wherein the interchanging of at least one bit comprises reassigning the at least one bit from the least significant bits of the second field to the third field to increase the region size by increasing a number of offset bits.

5. The method of claim 4, wherein:
   the second region size is greater than the first region size; and the reassigning of the at least one bit to the third field increases the maximum number of cache lines tracked in the cache subsystem to correspond to increased region size.

6. The method of claim 2, wherein the first page size contains an amount of data equal to a multiple of two or more cache lines cached in the cache subsystem.

7. The method of claim 1, the method further comprising: configuring a second cache directory from tracking cache lines for the first region size to tracking cache lines for the second region size, wherein the second cache directory is coupled to a home node by a data fabric.

8. The method of claim 1, wherein:
the number of cache lines tracked per bit in a first field of the one or more cache entries is changed by a factor of two.

9. The method of claim 1, the method further comprising: for each entry of the one or more cache directory entries, reallocating the entry for tracking another portion of the memory when the value of the third field in the entry reaches a threshold value.

10. A system comprising:
one or more home nodes coupled to one or more cache directories, each cache directory configured to:
change from tracking cache lines for a first region size per cache line entry to tracking cache lines for a second region size per cache line entry, and
change a number of cache lines tracked per bit in a first field of the cache directory,
wherein the first region size is associated with a first page size of a memory and the second region size is associated with a second page size of the memory.

11. The system of claim 10 further comprising:
a plurality of processing nodes coupled to the one or more home nodes, each processing node comprising one or more processors and a cache subsystem including cache lines tracked by the one or more cache directories.

12. The system of claim 10, wherein to change from tracking cache lines from a first region size per cache line entry to tracking cache lines for a second region size per cache line entry comprises the one or more cache directories to interchange at least one bit between a second field and a third field of each cache line entry.

13. The system of claim 12, wherein each of the one or more home nodes is configured to receive a signal to initiate the interchange in the one or more cache directories of the at least one bit between the second field and the third field.

14. The system of claim 12, wherein to interchange the at least one bit comprises reassignment of at least one bit from the least significant bits of the second field to the third field, wherein the loss of the at least one bit in the second field increases the second region size compared to the first region size and the addition of the at least one bit in the third field increases the maximum number of cache lines tracked by each of the one or more cache directory entries.

15. The system of claim 10, wherein:
at least one of the one or more home nodes is configured to configure a second cache directory from tracking cache lines for the first region size to tracking cache lines for the second region size, and
the second cache directory is coupled to a coherent slave by a data fabric.

16. The system of claim 10, wherein the first field is for tracking cache lines for the second region size.

17. The system of claim 10, wherein the second page size contains an even multiple of two or more cache lines cached in the cache subsystem.

18. A computing device, comprising:
a cache directory including one or more cache entries and configured to:
change from tracking cache lines for a first region size per cache line entry to tracking cache lines for a second region size per cache line entry, and
change a number of cache lines tracked per bit in a first field of the one or more cache entries,
wherein the first region size is associated with a first page size of a memory and the second region size is associated with a second page size of the memory.

19. The computing device of claim 18, further comprising:
a cache directory controller coupled to the cache directory and configured to interchange in the one or more cache entries at least one bit between a second field and a third field of each cache entry to change from the first region size to the second region size.

20. The computing device of claim 19, wherein the cache directory controller to interchange the at least one bit comprises reassignment of the at least one bit from the least significant bits of the second field to the third field, wherein the loss of the at least one bit in the second field increases the second region size compared to the first region size and the addition of the at least one bit in the third field increases maximum number of cache lines tracked by each of the one or more cache directory entries.

21. The computing device of claim 18, wherein the second page size contains an even multiple of two or more cache lines cached in the cache subsystem.

* * * * *